(12) United States Patent
Dang et al.

(10) Patent No.: US 8,390,314 B2
(45) Date of Patent: Mar. 5, 2013

(54) METHOD OF HALF-BIT PRE-EMPHASIS FOR MULTI-LEVEL SIGNAL

(75) Inventors: Harry H. Dang, San Diego, CA (US); Vannam Dang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/006,451

(22) Filed: Jan. 14, 2011

(65) Prior Publication Data

US 2012/0182043 A1 Jul. 19, 2012

(51) Int. Cl.
*H03K 19/003* (2006.01)
(52) U.S. Cl. .......................... 326/21; 326/93
(58) Field of Classification Search ............ None
See application file for complete search history.

(56) References Cited

U.S. PATENT DOCUMENTS

| | | | |
|---|---|---|---|
| 3,980,826 A | | 9/1976 | Widmer |
| 4,799,022 A | * | 1/1989 | Skierszkan ............ 327/116 |
| 6,570,406 B2 | | 5/2003 | Tang et al. |
| 7,051,127 B2 | * | 5/2006 | Molgaard et al. ........ 710/100 |
| 7,158,593 B2 | * | 1/2007 | Kim et al. ................ 375/354 |
| 7,667,554 B2 | | 2/2010 | Tanabe |
| 7,733,128 B2 | | 6/2010 | Miura |
| 2006/0132209 A1 | * | 6/2006 | Meltzer et al. ........... 327/202 |
| 2009/0003463 A1 | | 1/2009 | Muraoka et al. |
| 2012/0161811 A1 | * | 6/2012 | Thinakaran et al. ....... 326/30 |

OTHER PUBLICATIONS

Carusone et al., "A 32/16-Gb/s Dual-Mode Pulsewidth Modulation Pre-Emphasis (PWN-PE) Transmitter With 30-dB Loss Compensation Using a High-Speed CML Design Methodology", IEEE Transactions on Circuits and Systems I: Regular Papers, Aug. 1, 2009, pp. 1794-1806, vol. 56, No. 8, IEEE Circuits and Systems Society, XP011333498, ISSN: 1549-8328, 10.1109/TCSI.2009.2024903.
International Search Report and Written Opinion—PCT/US2012/021437—ISA/EPO—Apr. 18, 2012.
Shih et al., "10 Mb/s twisted pair CMOS transceiver with transmit waveform pre-equalization", Proceedings of the IEEE 1991 Custom Integrated Circuits, May 12-15, 1991, pp. 7.3/1-7.3/4, IEEE, XP010044578, ISBN: 978-0-7803-0015-6, DOI: 10.1109/CICC.1991.164014.

* cited by examiner

*Primary Examiner* — Crystal L Hammond
(74) *Attorney, Agent, or Firm* — Sam Talpalatsky; Nicholas J. Pauley; Jonathan T. Velasco

(57) ABSTRACT

Methods and apparatus for improving transmission channel efficiency are provided. In an example, a digital signal is received. A leading portion of a bit in the digital signal is pre-emphasized. The received digital signal is modulated with a pre-emphasis signal to pre-emphasize a leading portion of the bit in the digital signal. The pre-emphasis signal provides pre-emphasis substantially when a clock is high and the received digital signal transitions. The pre-emphasis signal does not provide pre-emphasis when the received digital signal is low or the received digital signal is unchanged. The pre-emphasized digital signal is then transmitted via the transmission channel. In an example, the received digital signal us a pulse-amplitude modulated multilevel signal.

20 Claims, 7 Drawing Sheets

US 8,390,314 B2

METHOD OF HALF-BIT PRE-EMPHASIS FOR MULTI-LEVEL SIGNAL

FIELD OF DISCLOSURE

This disclosure relates generally to electronics, and more specifically, but not exclusively, to apparatus and methods for improving transmission channel efficiency.

BACKGROUND

In high-speed digital data communications, a transmitted digital signal is attenuated by the transmission channel (i.e, transmission medium) through which the digital signal travels. The attenuation causes intersymbol interference (ISI) and increases jitter.

ISI arises because of temporal "spreading" of a transmitted symbol pulse due to a dispersive nature of the channel, which results in an overlap of adjacent symbol pulses. In other words, ISI occurs when a portion of a digital signal representative of one piece of information interferes with a different portion of the digital signal representative of a different piece of information. The transmitted symbol pulses may arrive at a receiver at different times. Components of adjacent symbol pulses may interfere constructively or destructively. Adverse effects of ISI are pronounced when a signal to noise ratio is high and the channel is relatively noise-free. In relatively noise-free channels, the presence of ISI greatly degrades performance of the communication system.

Timing jitter is a temporal disorder related to variability in a latency time of the transmitted digital signal. In other words, the transmission medium through which the digital signal travels introduces a variable phase delay into the transmitted digital signal.

An eye diagram provides a convenient way to evaluate the impact of ISI and jitter-related impairments. The eye diagram is formed by superimposing waveforms of multiple pulse sequences of the transmitted digital signal. The eye diagram typically looks like an eye between a pair of rails. An eye diagram is useful to a circuit designer, because the eye diagram indicates levels of ISI and jitter imparted by the transmission medium into the transmitted digital signal. An open eye pattern indicates minimal signal distortion. A closed eye pattern indicates levels of ISI and jitter so severe that a received signal may be unintelligible.

Once a level of ISI and jitter is determined, full-bit pre-equalization can be used to minimize the effects of ISI. Full-bit pre-equalization in a transmitter boosts the amplitude of the digital signal prior to transmission, so that the digital signal may be more easily decoded at the receiver. The digital signal is altered at the transmitter so that the influence of the channel on the digital signal yields a received digital signal capable of being decoded at the receiver. Conventionally, full-bit pre-equalization increases the amplitude of the digital signal at every digital data transition, and leaves the amplitude unchanged when there is no transition of the digital data.

FIG. 1 illustrates conventional full-bit pre-equalization 100. An input digital data signal 105 (Data_in) to be transmitted is shown. A full-bit pre-emphasis signal 110 (Pre-emph) is also illustrated. When the full-bit pre-emphasis signal 110 is high, full-bit pre-emphasis is enabled, and the amplitude of the state of the input digital data signal 105 is increased for the full duration of each pre-emphasized bit, as shown in the full-bit emphasis data out waveform 115 (Data_out).

An effect of full-bit pre-emphasis is increased noise of the transmitted digital data signal, particularly when multi-level data is transmitted. The added noise decreases a sampling margin at the receiver. For example, in a 4-PAM (4-level pulse-amplitude modulation) output driver, the conventional full-bit pre-emphasis method introduces noise to each of the four logic levels, which leads to data sampling errors at the receiver.

Accordingly, there are long-felt industry needs for apparatus and methods to improve transmission channel efficiency, and improve the eye opening of a transmitted pulse amplitude modulated signal, without affecting the sampling margin.

SUMMARY

Exemplary embodiments are directed to systems and methods for improving transmission channel efficiency and improving eye opening of a transmitted signal, without affecting a sampling margin.

In an example, methods and apparatus for improving transmission channel efficiency are provided. A digital signal is received. A leading portion of a bit in the digital signal is modulated with a pre-emphasis signal to pre-emphasize the bit. Pre-emphasis is generated in the pre-emphasis signal substantially when a clock is high and the received digital signal transitions. Pre-emphasis is not generated in the pre-emphasis signal when the received digital signal is low or the received digital signal is unchanged. The pre-emphasized digital signal is transmitted via the transmission channel. The received digital signal can be a pulse-amplitude modulated multilevel signal. In a further example, provided is a non-transitory computer-readable medium, comprising instructions stored thereon that, if executed by a processor, cause the processor to execute at least a part of the aforementioned method for improving transmission channel efficiency.

In another example, provided is an apparatus configured to improve transmission channel efficiency. The apparatus includes means for receiving a digital signal and means for pre-emphasizing a leading portion of a bit. The means for pre-emphasizing the leading portion of the bit can include means for modulating the received digital signal to pre-emphasize a leading portion of the bit in the digital signal. The means for pre-emphasizing the leading portion of the bit can also include means for generating pre-emphasis in the pre-emphasis signal substantially when a clock is high and the received digital signal transitions. The pre-emphasis is not generated when the pre-emphasis signal is low or the received digital signal is unchanged. The apparatus can also include means for transmitting the pre-emphasized digital signal via the transmission channel. In an example, the received digital signal is a pulse-amplitude modulated multilevel signal. The apparatus can further include a device, such as a set top box, music player, video player, entertainment unit, navigation device, communications device, personal digital assistant (PDA), fixed location data unit, and a computer, into which the apparatus is integrated. At least a part of the apparatus can be integrated in a semiconductor die. A transmitter can include the apparatus.

In an example, provided is an apparatus configured to generate a pre-emphasis signal. The apparatus includes a clock, a buffer configured to receive a digital signal, and a pre-emphasis amplifier. The pre-emphasis amplifier is coupled in parallel with the buffer, and configured to be gated with a half-bit pre-emphasis signal. A data encoder is coupled to the input of the buffer and the clock, and is configured to generate a full-bit pre-emphasis signal having a logic one for one clock cycle when the received digital signal transitions. A half-bit pre-emphasis signal generator is coupled to the data encoder output and the clock. The half-bit pre-emphasis signal generator is configured to generate a half-bit pre-emphasis signal having: 1.) a logic one when the clock signal is high and the full-bit pre-emphasis signal is high, and 2.) a logic zero when the clock signal is low or the full-bit pre-emphasis signal is low. The half-bit pre-emphasis signal generator can include an inverter having cross-coupled output drivers coupled between the data encoder and the pre-emphasis amplifier. The half-bit pre-emphasis signal generator has a gating transistor coupled in series between the inverter and a power supply. The gating transistor is controlled by the clock. In an example, the received digital signal can be a pulse-amplitude modulated multilevel signal. The apparatus can further include a device, such as a set top box, music player, video player, entertainment unit, navigation device, communications device, personal digital assistant (PDA), fixed location data unit, and a computer, into which the apparatus is integrated. At least a part of the apparatus can be integrated in a semiconductor die. A transmitter can include the apparatus.

The foregoing has broadly outlined the features and technical advantages of the present teachings in order that the detailed description that follows may be better understood. Additional features and advantages are described herein, which form the subject of the claims. The conception and specific embodiments disclosed can be readily utilized as a basis for modifying or designing other structures for carrying out the same purposes of the present teachings. Such equivalent constructions do not depart from the technology of the teachings as set forth in the appended claims. The novel features which are believed to be characteristic of the teachings, both as to its organization and method of operation, together with further objects and advantages are better understood from the following description when considered in connection with the accompanying figures. Each of the figures is provided for the purpose of illustration and description only, and do not define limits of the present teachings.

BRIEF DESCRIPTION OF THE DRAWINGS

The accompanying drawings are presented to describe examples of the present teachings, and are not provided as limitations.

Figure 1:
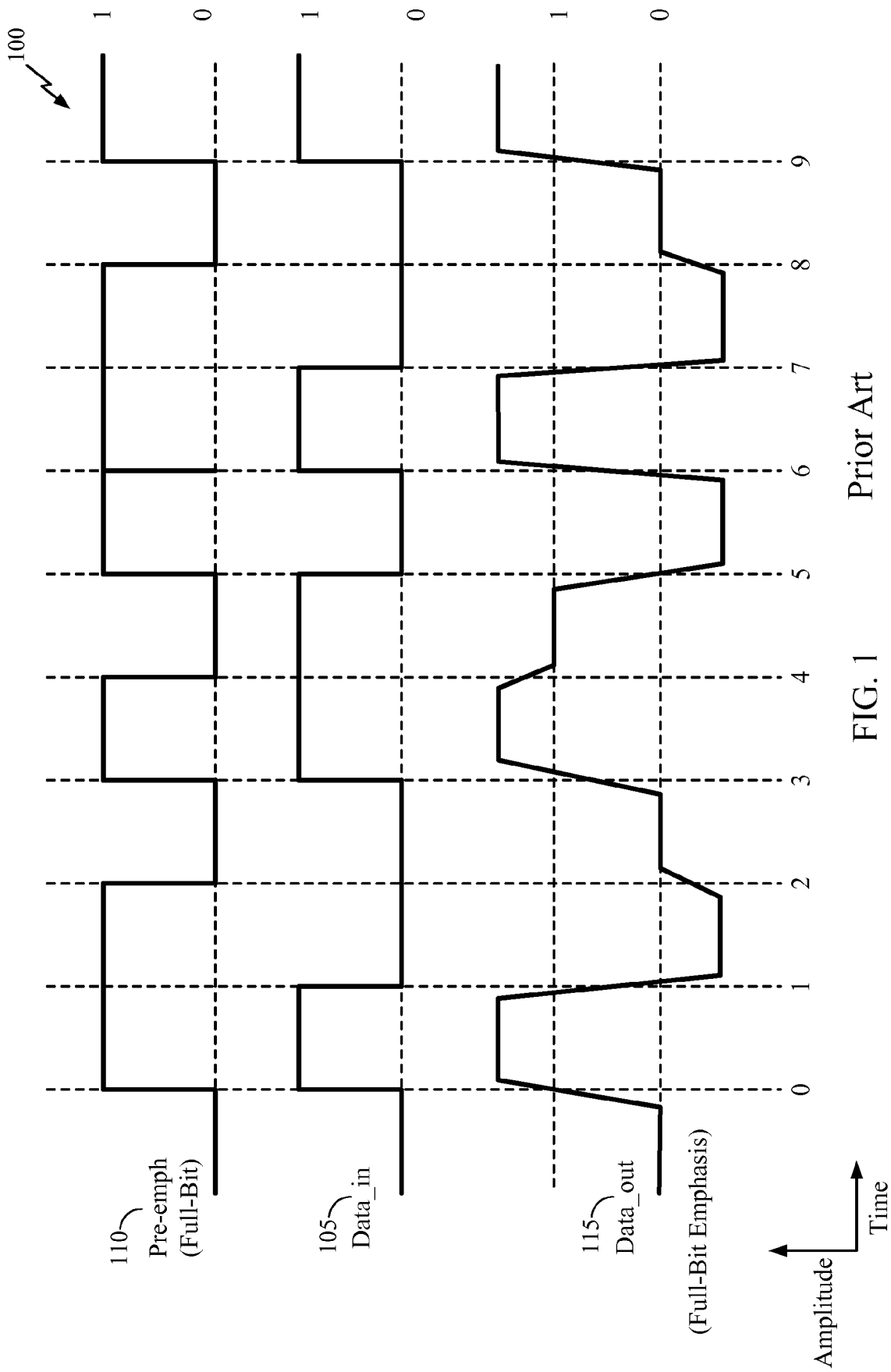
FIG. 1 illustrates conventional full-bit pre-equalization.

In accordance with common practice, the various features illustrated in the drawings may not be drawn to scale. Accordingly, the dimensions of the various features may be arbitrarily expanded or reduced for clarity. In accordance with common practice, some of the drawings are simplified for clarity. Thus, the drawings may not depict all components of a given apparatus (e.g., device) or method. Finally, like reference numerals are used to denote like features throughout the specification and figures.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal.

Some of the waveforms described hereby, and depicted in the figures, are described as having ideal timing (e.g., having instantaneous rise and fall times) for illustrative purposes only, and are not limiting descriptors. Practical implementations of the methods and apparatuses described hereby can have non-ideal timing providing the functions described hereby. For example, transitions of a signal from low to high, or high to low can occur substantially synchronous with another signal.

Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Introduction

Methods and apparatus for improving transmission channel efficiency are provided. In an example, a digital signal is received. A leading portion of a bit in the digital signal is modulated with a pre-emphasis signal to pre-emphasize the bit. Pre-emphasis is generated in the pre-emphasis signal substantially when a clock is high and the received digital signal transitions. Pre-emphasis is not generated in the pre-emphasis signal when the received digital signal is low or the received digital signal is unchanged. The pre-emphasized digital signal is then transmitted via the transmission channel. In an example, the received digital signal is a pulse-amplitude modulated multilevel signal.

DESCRIPTION OF THE FIGURES

Figure 2:
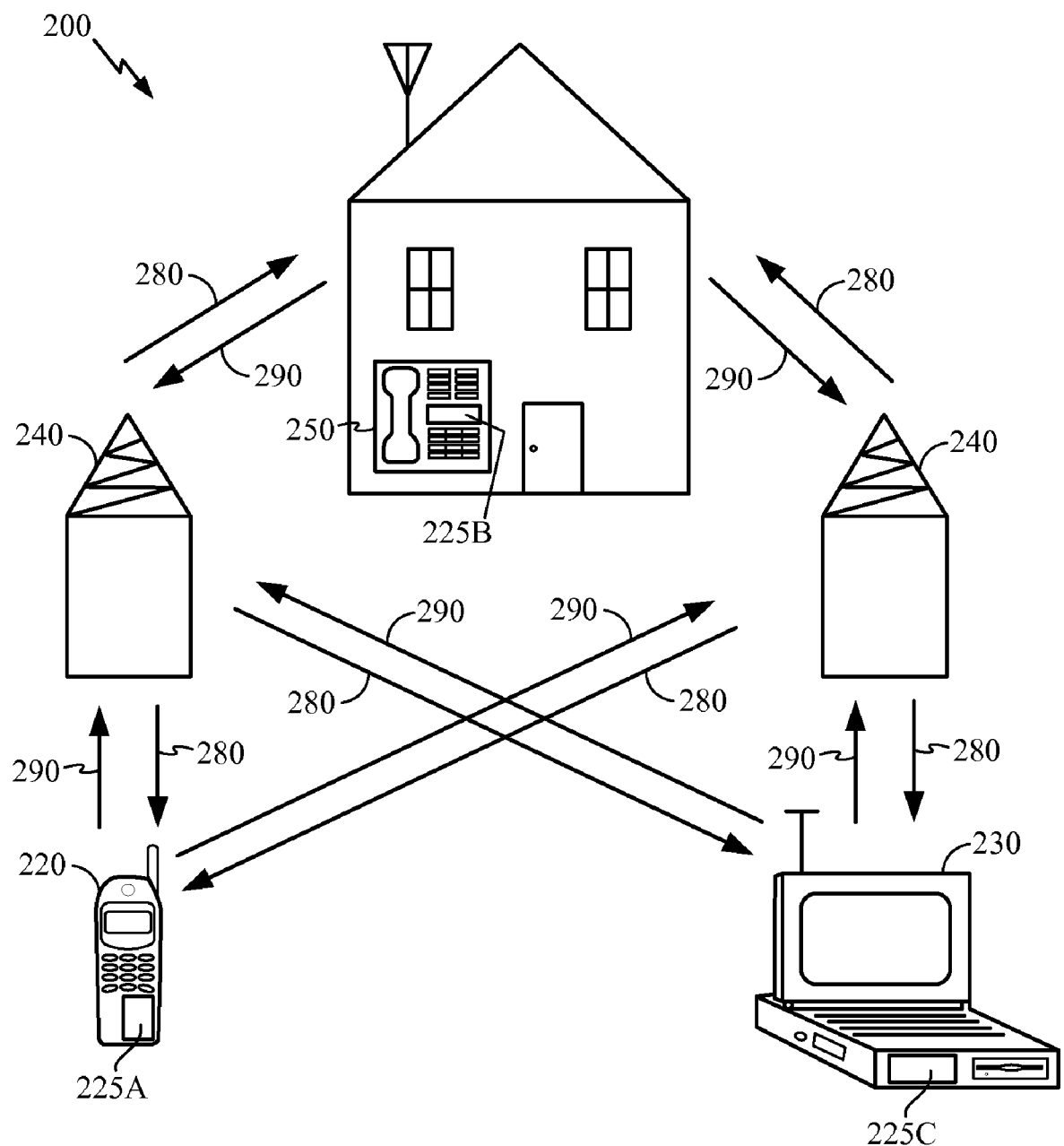
FIG. 2 depicts an exemplary communication system.

FIG. 2 depicts an exemplary communication system 200 in which an embodiment of the disclosure may be advantageously employed. For purposes of illustration, FIG. 2 shows three remote units 220, 230, and 250 and two base stations 240. It will be recognized that conventional wireless communication systems may have many more remote units and base stations. The remote units 220, 230, and 250 include at least a part of an embodiment 225A-C of the disclosure as discussed further below. FIG. 2 shows forward link signals 280 from the base stations 240 and the remote units 220, 230, and 250, as well as reverse link signals 290 from the remote units 220, 230, and 250 to the base stations 240.

In FIG. 2, the remote unit 220 is shown as a mobile telephone, the remote unit 230 is shown as a portable computer, and the remote unit 250 is shown as a fixed location remote unit in a wireless local loop system. For example, the remote units may be transmitters, mobile phones, hand-held personal communication systems (PCS) units, portable data units such as personal data assistants, navigation devices (such as GPS enabled devices), set top boxes, music players, video players, entertainment units, fixed location data units (e.g., meter reading equipment), or any other device that stores or retrieves data or computer instructions, or any combination thereof. Although FIG. 2 illustrates remote units according to the teachings of the disclosure, the disclosure is not limited to these exemplary illustrated units. Embodiments of the disclosure may be suitably employed in any device.

Figure 3:
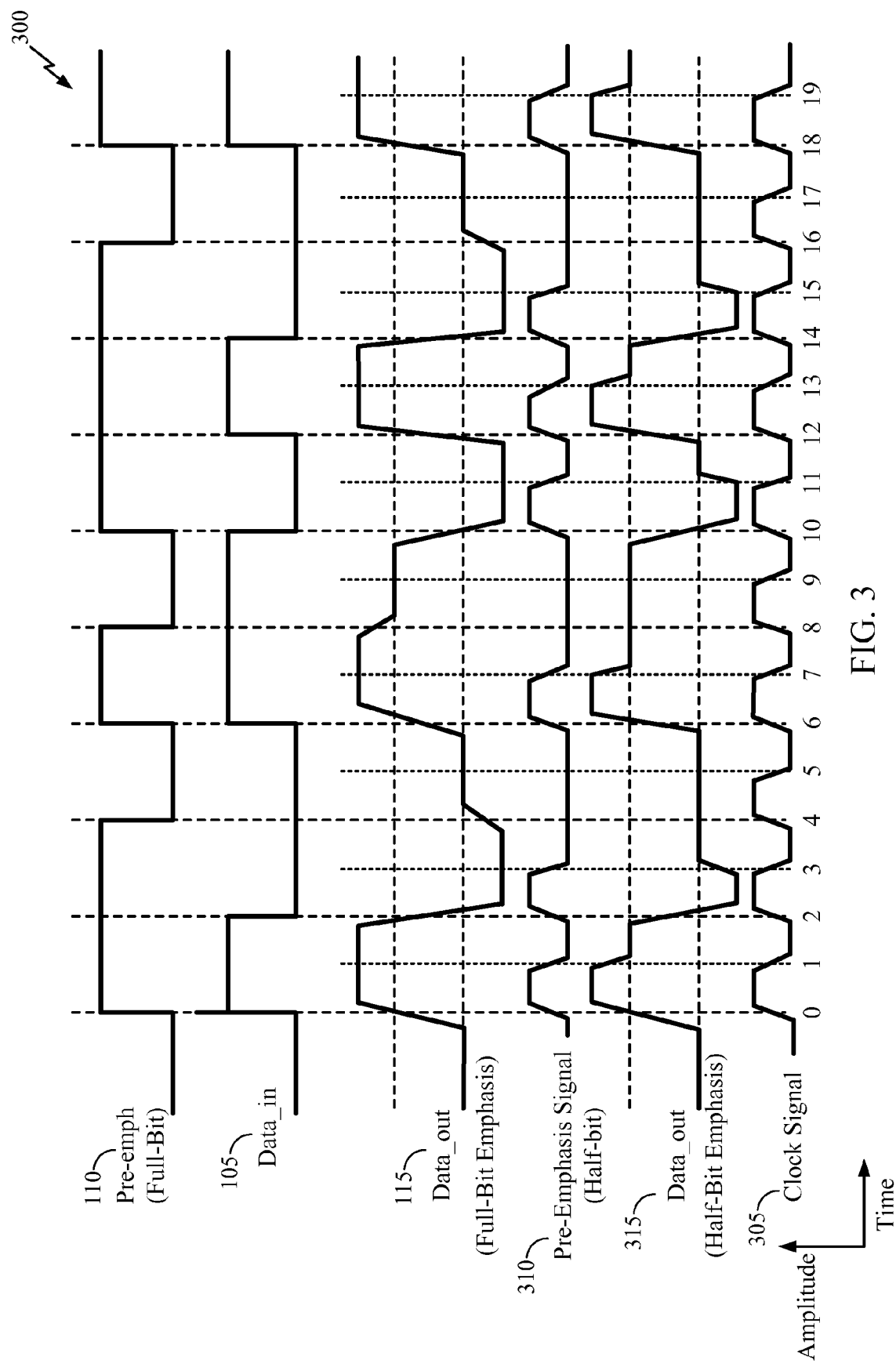
FIG. 3 depicts exemplary half-bit pre-emphasis waveforms.

FIG. 3 depicts exemplary half-bit pre-emphasis waveforms 300. Conventional waveforms, such as the input digital data signal 105 (Data_in), the full-bit pre-emphasis signal 110 (Pre-emph), and the full-bit emphasis data out waveform 115 (Data_out) are shown for comparison. A clock signal 305, having a frequency twice that of the input digital data signal 105, and substantially synchronized with the input digital data signal 105, is also shown.

FIG. 3 shows a half-bit pre-emphasis signal 310 that controls when the input digital data signal 105 is pre-emphasized. The half-bit pre-emphasis signal 310 is a bistable signal. In the example shown in FIG. 3, the half-bit pre-emphasis signal 310 has a logic one when the input digital data signal 105 is pre-emphasized, and has a logic zero when the input digital data signal is not pre-emphasized. Pre-emphasis timing depends on the state of the clock signal 305, and the state of the input digital data signal 105.

Pre-emphasis is provided when the clock signal 305 is high and the input digital data signal 105 transitions. Pre-emphasis is not provided when the clock signal 305 is low, or when the input digital data signal 105 is unchanged.

The clock signal 305 ensures the half-bit pre-emphasis signal 310 only pre-emphasizes the leading half of the bit in the input digital data signal 105. The clock signal 305 also ensures the half-bit pre-emphasis signal 310 does not pre-emphasize the latter half of the bit in the input digital data signal 105. For example, in FIG. 3, the clock signal 305 is high from time zero to time one, thus the half-bit pre-emphasis signal 310 can be high during this period, dependent upon the input digital data signal 105. From time one to time two, the clock signal 305 is low, thus the half-bit pre-emphasis signal 310 cannot be high during this period. The input digital data signal 105 has a bit that is high from time zero to time two, thus the half-bit pre-emphasis signal 310 can only be high during the leading half of the bit (i.e., from time zero to time one).

FIG. 3 also depicts a half-bit pre-emphasis data out waveform 315 (Data_out) that is transmitted via the transmission channel. The half-bit pre-emphasis data out waveform 315 is based on both the input digital data signal 105 and the half-bit pre-emphasis signal 310. When the input digital data signal 105 is not pre-emphasized, a buffered version of the input digital data signal 105 is output to the transmission channel. When the input digital data signal 105 is half-bit pre-emphasized, an amplified version of the input digital data signal 105 is output to the transmission channel. The half-bit pre-emphasis signal 310 controls provision of the amplified version of the input digital data signal 105 to the transmission channel. The half-bit pre-emphasis signal 310 is not added to the input digital data signal 105. When the input digital data signal 105 has a logic zero, the associated voltage of the input digital data signal 105 need not be zero, particularly when the input digital data signal 105 is a multilevel signal (i.e., a pulse-amplitude modulated signal) and/or a differential signal.

For example, in FIG. 3, from time zero to time one, the half-bit pre-emphasis signal 310 is high, thus the amplified version of the input digital data signal 105 is provided to the transmission channel from time zero to time one. The effect of providing pre-emphasis from time zero to time one is reflected in the half-bit pre-emphasis data out waveform 315 as an increase in voltage amplitude beyond that of the input digital data signal 105 rail voltage, during time zero to time one. From time one to time two, the half-bit pre-emphasis signal 310 is low, thus the buffered version of the input digital data signal 105 is provided to the transmission channel from time one to time two. The effect of not providing pre-emphasis from time one to time two is reflected in the half-bit pre-emphasis data out waveform 315 as the half-bit pre-emphasis data out waveform 315 being substantially equal to the input digital data signal 105 during time one to time two. From time two to time three, the half-bit pre-emphasis signal 310 is high, thus the amplified version of the input digital data signal 105 is provided to the transmission channel from time two to time three. The effect of providing pre-emphasis from time two to time three is reflected in the half-bit pre-emphasis data out waveform 315 as an increase in voltage amplitude beyond that of the input digital data signal 105 rail voltage during time zero to time one.

Figure 4:
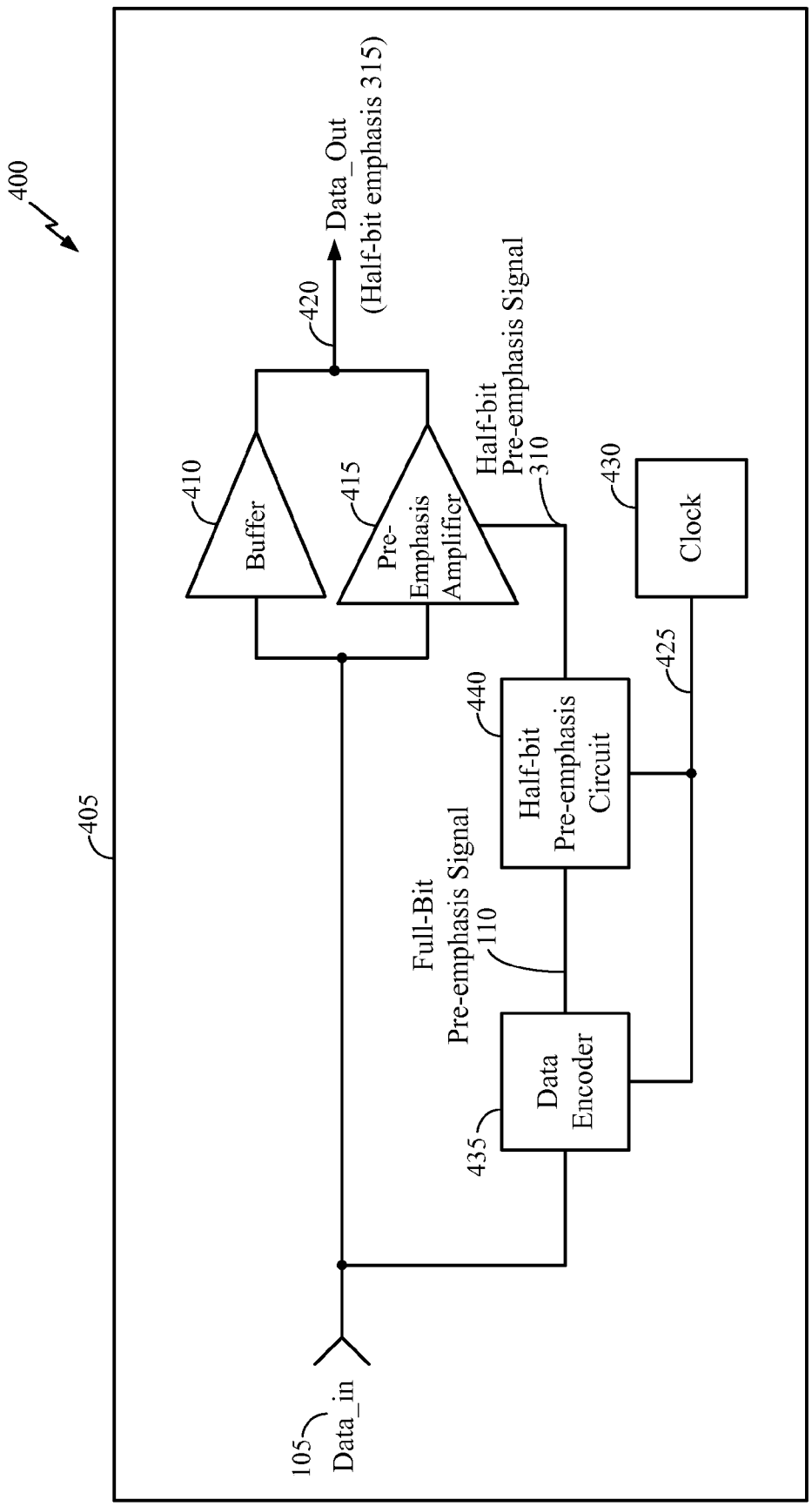
FIG. 4 depicts an exemplary half-bit pre-emphasis circuit.

FIG. 4 depicts an exemplary half-bit pre-emphasis circuit 400. The exemplary half-bit pre-emphasis circuit 400 is deposited on a semiconductor substrate 405. The input digital data signal 105 is input to a buffer 410 providing substantially unity gain. The buffer 410 outputs, to a transmission channel 420, the half-bit pre-emphasis data out waveform 315 when the input digital data signal 105 is not pre-emphasized.

The input digital data signal 105 is also input to a pre-emphasis amplifier 415. The output of the pre-emphasis amplifier 415 is gated with the half-bit pre-emphasis signal 310. When the half-bit pre-emphasis signal 310 is high, the pre-emphasis amplifier 415 provides, to the transmission channel 420, an amplified version of the input digital data signal 105 as the half-bit pre-emphasis data out waveform 315. When the half-bit pre-emphasis signal 310 is low, the pre-emphasis amplifier 415 does not output a signal, and the buffer 410 provides the half-bit pre-emphasis data out waveform 315.

The half-bit pre-emphasis signal 310 is created from the input digital data signal 105 and a clock signal 425 supplied by a clock 430. The input digital data signal 105 is input to a data encoder 435. The data encoder 435 generates the full-bit pre-emphasis signal 110 from the input digital data signal 105 by outputting a logic one for one complete clock cycle anytime the input digital data signal 105 transitions from low to high, or high to low. Otherwise, the data encoder 435 outputs a logic zero.

The full-bit pre-emphasis signal 110 is input to a half-bit pre-emphasis circuit 440, which creates the half-bit pre-emphasis signal 310 from the full-bit pre-emphasis signal 110 and the clock signal 425. The half-bit pre-emphasis circuit 440 then sends the half-bit pre-emphasis signal 310 to gate the pre-emphasis amplifier 415. Detailed operation of the half-bit pre-emphasis circuit 440 is described with regard to FIG. 5.

Figure 5:
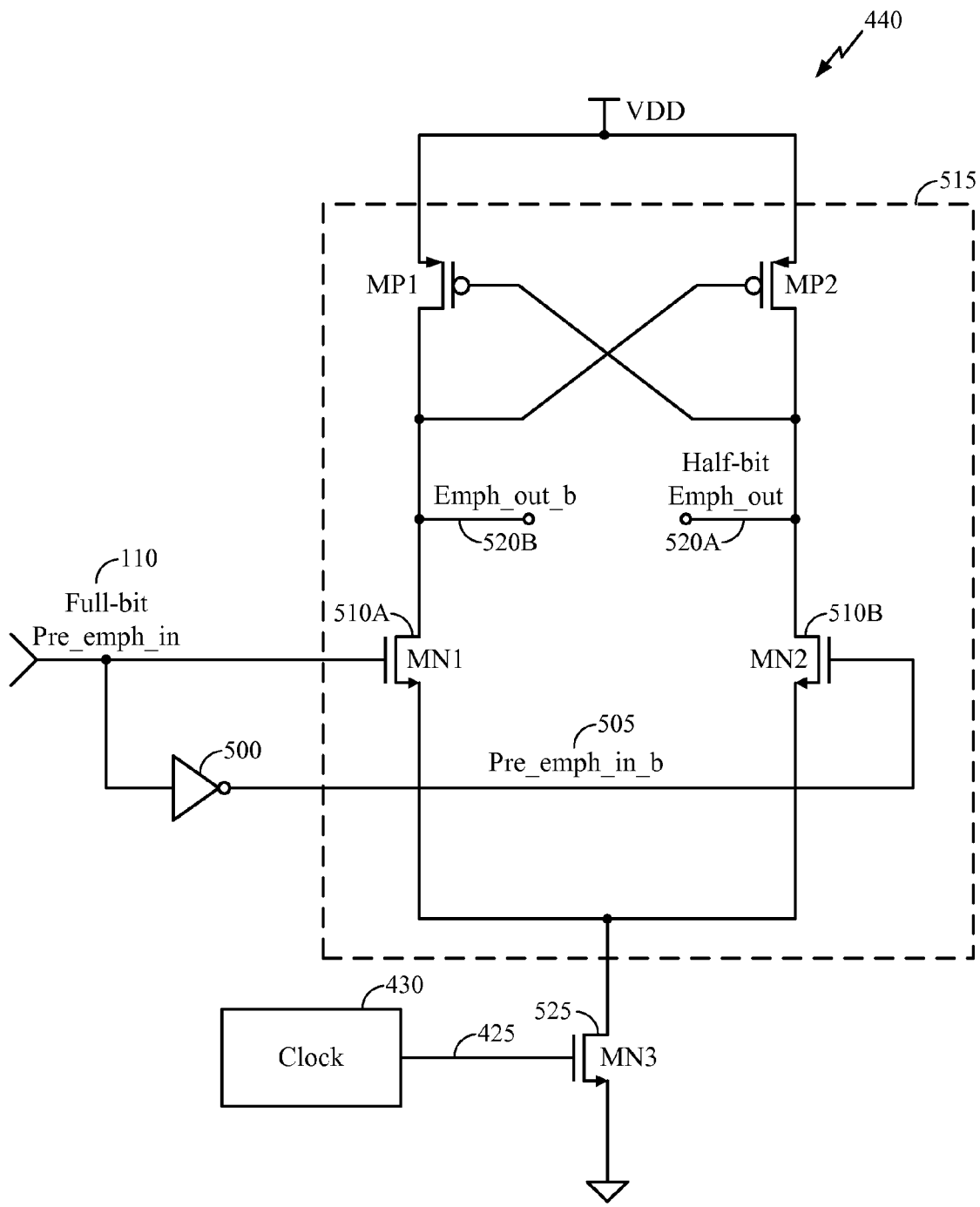
FIG. 5 depicts an exemplary half-bit pre-emphasis signal generator.

FIG. 5 depicts an exemplary half-bit pre-emphasis signal generator 440. In the half-bit pre-emphasis signal generator 440, the full-bit pre-emphasis signal 110 is input to a first inverter 500 to create an inverted full-bit pre-emphasis signal 505 (Pre_emph_in_b). The full-bit pre-emphasis signal 110 and the inverted full-bit pre-emphasis signal 505 control two transistors 510A, 510B (MN1, MN2) in a second inverter 515 having a cross-coupled output drivers (MP1, MP2). The inverter 515 outputs the half-bit pre-emphasis signal 310 via a first output 520A and an inverted version of the half-bit pre-emphasis signal 310 via a second output 520B. The half-bit pre-emphasis circuit 440 then sends the half-bit pre-emphasis signal 310 to gate the pre-emphasis amplifier 415.

Power to the second inverter is gated with a transistor 525 (MN3) that is controlled with the clock signal 425 provided by the clock 430. Gating power to the second inverter 515 ensures the half-bit pre-emphasis signal 310 only pre-emphasizes the leading half of the bit in the input digital data signal 105, as described above with respect to FIG. 3. Gating power to the second inverter 515 also ensures the half-bit pre-emphasis signal 310 does not pre-emphasize the latter half of the bit in the input digital data signal 105.

Figure 6:
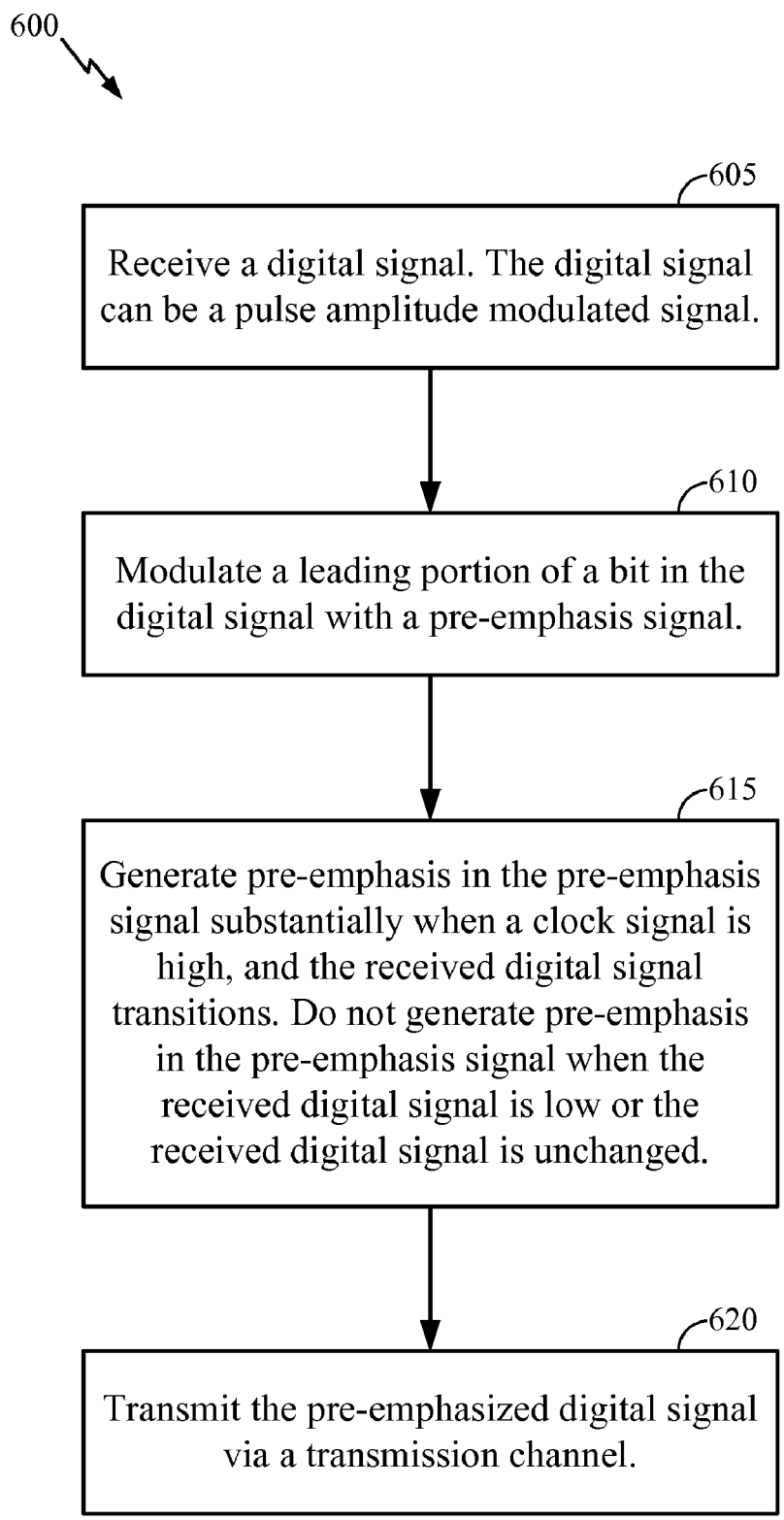
FIG. 6 depicts an exemplary method for improving transmission channel efficiency.

FIG. 6 depicts an exemplary method for improving transmission channel efficiency 600. The method for improving transmission channel efficiency 600 can be performed by the apparatus described hereby, such as the exemplary half-bit pre-emphasis circuit 400.

In step 605, a digital signal is received. The digital signal can be a pulse amplitude modulated signal.

In step 610, a leading portion of a bit in the digital signal is modulated with a pre-emphasis signal such as, the half-bit pre-emphasis signal 310.

In step 615, pre-emphasis is generated in the pre-emphasis signal substantially when a clock signal is high, and the received digital signal transitions. Pre-emphasis is not generated in the pre-emphasis signal when the received digital signal is low, or the received digital signal is unchanged.

In step 620, the pre-emphasized digital signal is transmitted via the transmission channel.

Figure 7:
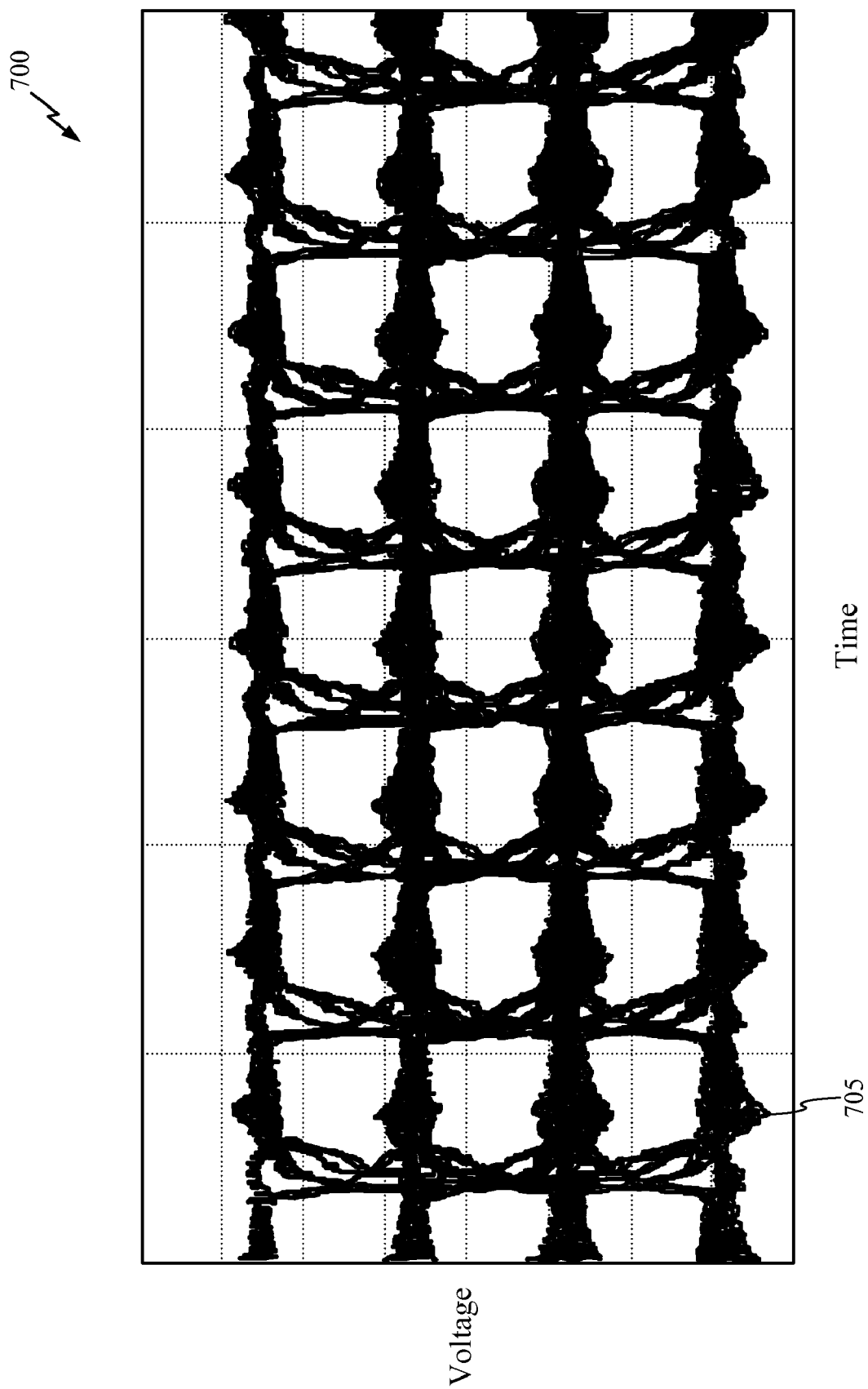
FIG. 7 depicts an eye diagram of a multilevel digital signal having half-bit pre-emphasis.

FIG. 7 depicts an eye diagram 700 of a multilevel digital signal having half-bit pre-emphasis. Half-bit pre-emphasis can be applied to multilevel digital signals having any number of levels greater than, or equal to, two levels. In the example shown in FIG. 7, a four-level pulse-amplitude modulated (PAM) signal having half-bit pre-emphasis is shown. The effects of applying half-bit pre-emphasis are apparent in FIG. 7 as eyes that are open more than they would otherwise be in the absence of half-bit pre-emphasis. Half-bit pre-emphasis shortens transition durations (i.e., rail-to-rail rise and fall times are faster), which increases eye opening. Half-bit pre-emphasis in the multilevel digital signal is apparent as a voltage overshoot 705 above and/or below the rails of the eyes, just after the transitions. As can be seen in FIG. 7, the duration of the voltage overshoot 705 when using half-bit pre-emphasis is shorter than a duration of a voltage overshoot occurring from full-bit pre-emphasis. Thus, when compared to full-bit pre-emphasis, half-bit pre-emphasis avoids unnecessary amplitude increasing, which in turn improves eye-opening and reduces dynamic power of the transmitted digital signal.

CONCLUSION

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In some aspects, the teachings herein can be employed in a multiple-access system capable of supporting communication with multiple users by sharing the available system resources (e.g., by specifying one or more of bandwidth, transmit power, coding, interleaving, and so on). For example, the teachings herein can be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1×RTT, 1×EV-DO RelO, RevA, RevB) technology and other technologies. The techniques can be used in emerging and future networks and interfaces, including Long Term Evolution (LTE).

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices described herein.

Nothing that has been stated or illustrated is intended to cause a dedication of any component, step, feature, object, benefit, advantage, or equivalent to the public, regardless of whether it is recited in the claims.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

What is claimed is:

1. A method for improving transmission channel efficiency, comprising:
    receiving a digital signal;
    modulating a leading portion of a bit in the digital signal with a half-bit pre-emphasis signal;
    generating pre-emphasis in the half-bit pre-emphasis signal substantially when a clock is high and the received digital signal transitions;
    generating a full-bit pre-emphasis signal having, for one clock cycle, a logic one when the received digital signal transitions, wherein the half-bit pre-emphasis signal comprises:
        a logic one when the clock signal is high and the full-hit pre-emphasis signal is high; and
        a logic zero when the clock signal is low or the full-bit pre-emphasis signal is low; and
    transmitting the pre-emphasized digital signal via the transmission channel.

2. The method of claim 1, wherein the received digital signal is a pulse-amplitude modulated signal.

3. The method of claim 1, wherein pre-emphasis is not generated in the pre-emphasis signal when the received digital signal is low or the received digital signal is unchanged.

4. The method of claim 1, further comprising generating a full-bit pre-emphasis signal having, for one clock cycle, a logic one when the received digital signal transitions, wherein the half-bit pre-emphasis signal comprises:
    a logic one when the clock signal is high and the full-bit pre-emphasis signal is high; and
    a logic zero when the clock signal is low or the full-bit pre-emphasis signal is tow.

5. An apparatus configured to improve transmission c efficiency, comprising:
    means for receiving a digital signal;
    means for modulating a leading portion of the bit in the digital signal with a half-bit pre emphasis signal;
    means for generating pre-emphasis in the half-bit pre-emphasis signal substantially when a clock is high and the received digital signal transitions;
    means for generating a full-hit pre-emphasis signal having, for one clock cycle, a logic one when the received digital signal transitions, wherein the half-bit pre-emphasis signal comprises:
        a logic one when the clock signal is high and the full-bit pre-emphasis signal is high and
        a logic zero when the clock signal is low or the full-bit pre-emphasis signal is low; an
    means for transmitting the pre-emphasized digital signal via the transmission channel.

6. The apparatus of claim 5, wherein the received digital signal is a pulse-amplitude modulated signal.

7. The apparatus of claim 5, wherein the means for generating pre-emphasis is configured to not generate pre-emphasis in the pre-emphasis signal when the received digital signal is low or the received digital signal is unchanged.

8. The apparatus of claim 5, further comprising a device, selected from the group consisting of a set top box, music player, video player, entertainment unit, navigation device, communications device, personal digital assistant (PDA), fixed location data unit, and a computer, into which the apparatus is integrated.

9. The apparatus of claim 5, wherein at least a part of the apparatus is integrated in a semiconductor die.

10. A transmitter comprising the apparatus of claim 5.

11. The apparatus of claim 5, further comprising means for generating a full-bit pre-emphasis signal having, for one clock cycle, a logic one when the received digital signal transitions, wherein the half-bit pre-emphasis signal comprises:
   a logic one when the clock signal is high and the full-bit pre-emphasis signal is high; and
   a logic zero when the clock signal is low or the full-bit pre-emphasis signal is low.

12. A non-transitory computer-readable medium, comprising instructions stored thereon that, if executed by a lithographic device, cause the lithographic device to fabricate a device, comprising:
   a buffer configured to receive a digital signal;
   a clock configured to generate a clock signal having a frequency double the frequency of the received digital signal;
   a pre-emphasis amplifier coupled in parallel with the buffer, and configured to be gated with a half-bit pre-emphasis signal;
   a data encoder coupled to the input of the buffer and the clock, and configured to generate a full-bit pre-emphasis signal having, for one clock cycle, a logic one when the received digital signal transitions; and
   a half-bit pre-emphasis signal generator coupled to the data encoder output and the clock, and configured to generate the half-bit pre-emphasis signal having:
      a logic one when the clock signal is high and the full-bit pre-emphasis signal is high; and
      a logic zero when the clock signal is low or the hill-bit pre-emphasis signal is low.

13. The non-transitory computer-readable medium of claim 12, wherein the device further comprises:
   a cross-coupled inverter having an input coupled to an output of the data encoder and an output coupled to an input of the pre-emphasis amplifier; and
   a gating transistor coupled in series between the cross-coupled inverter and a power supply, and controlled by the clock signal.

14. An apparatus configured to generate a pre-emphasis signal, comprising:
   a buffer configured to receive a digital signal,
   a clock configured to generate a clock signal having a frequency double the frequency of the received digital signal;
   a pre-emphasis amplifier coupled in parallel with the buffer, and configured to be gated, with a half-bit pre-emphasis signal;
   a data encoder coupled to the input of the buffer and the clock, and configured to generate the full-bit pre-emphasis signal having, for one clock cycle, a logic one when the received digital signal transitions; and
   a half-bit pre-emphasis signal generator coupled to the data encoder output and the clock, and configured to generate a half-bit pre-emphasis signal having:
      a logic one when the clock signal is high and the full-bit pre-emphasis signal is high; and
      a logic zero when the clock signal is low or the full-bit pre-emphasis signal is low.

15. The apparatus of claim 14, wherein the half-bit pre-emphasis signal generator comprises:
   a cross-coupled inverter having an input coupled to an output of the data encoder and an output coupled to an input of the pre-emphasis amplifier; and
   a gating transistor coupled in series between the cross-coupled inverter and a power supply, and controlled by the clock signal.

16. The apparatus of claim 14, wherein the received digital signal is a pulse-amplitude modulated signal.

17. The apparatus of claim 14, further comprising a device, selected from the group consisting of a set top box, music player, video player, entertainment unit, navigation device, communications device, personal digital assistant (PDA), fixed location data unit, and a computer, into which the apparatus is integrated.

18. The apparatus of claim 14, wherein at east a part of the apparatus is integrated in a semiconductor die.

19. A transmitter comprising the apparatus of claim 14.

20. A method for improving transmission channel efficiency, comprising:
   a step for receiving a digital signal;
   a step for modulating a leading portion of a bit in the digital signal with a half-bit pre-emphasis signal;
   a step for generating pre-emphasis in the half-bit pre-emphasis signal substantially when a clock is high and the received digital signal transitions; and
   a step for transmitting the pre-emphasized digital signal via the transmission channel.

* * * * *